US009714688B2

(12) United States Patent
Chu

(10) Patent No.: US 9,714,688 B2
(45) Date of Patent: Jul. 25, 2017

(54) SHOCK ABSORBER SPRING RETENTION STRUCTURE OF REMOTE CONTROL CAR

(71) Applicant: Daimler Chu, New Taipei (TW)

(72) Inventor: Daimler Chu, New Taipei (TW)

( * ) Notice: Subject to any disclaimer, the term of this patent is extended or adjusted under 35 U.S.C. 154(b) by 1 day.

(21) Appl. No.: 14/979,476

(22) Filed: Dec. 27, 2015

(65) Prior Publication Data

US 2017/0184171 A1    Jun. 29, 2017

(51) Int. Cl.
*F16F 1/12* (2006.01)
*F16F 13/00* (2006.01)
*B60G 15/06* (2006.01)
*A63H 30/00* (2006.01)
*A63H 17/26* (2006.01)
*F16F 9/56* (2006.01)

(52) U.S. Cl.
CPC ........... *F16F 1/122* (2013.01); *A63H 17/262* (2013.01); *A63H 30/00* (2013.01); *B60G 15/063* (2013.01); *F16F 13/007* (2013.01); *B60G 2202/12* (2013.01); *B60G 2202/24* (2013.01); *B60G 2204/12422* (2013.01); *B60G 2300/20* (2013.01); *F16F 9/56* (2013.01); *F16F 2222/12* (2013.01); *F16F 2230/0005* (2013.01)

(58) Field of Classification Search
CPC .. F16F 1/122; F16F 9/56; F16F 13/007; F16F 2222/12; F16F 2230/0005; A63H 17/262; A63H 30/00; B60G 15/063; B60G 2202/12; B60G 2202/24; B60G 2204/12422; B60G 2300/20

USPC .......... 267/202, 209, 216, 217, 221
See application file for complete search history.

(56) References Cited

U.S. PATENT DOCUMENTS

| | | | | |
|---|---|---|---|---|
| 3,365,194 A | * | 1/1968 | Strickland, Jr. ......... | A63G 13/08 267/177 |
| 4,093,198 A | * | 6/1978 | Petersen ................ | A63G 13/08 267/179 |
| 4,728,087 A | * | 3/1988 | Wils ........................ | F16F 1/122 248/624 |
| 4,736,983 A | * | 4/1988 | Furbee .................... | F16F 1/122 248/600 |
| 4,962,834 A | * | 10/1990 | Miner .................... | B60G 11/16 188/321.11 |
| 5,092,568 A | * | 3/1992 | Tachikawa .............. | F16F 1/122 267/170 |
| 5,580,315 A | * | 12/1996 | Katz ..................... | A63G 13/08 267/179 |

(Continued)

*Primary Examiner* — Thomas Irvin
(74) *Attorney, Agent, or Firm* — Leong C. Lei

(57) ABSTRACT

A shock absorber spring retention structure is provided for a remote control car. A spring is arranged between a shock absorption cylinder and a piston rod that are axially movable relative to each other to produce an effect of damping. The spring has a top supported on an adjustment ring that is threadingly screwed to an outer circumference of the shock absorption cylinder and a bottom having a wire rotatably coupled to a clip and held in position by a mounting seat to be coupled to a connection seat mounted to an end of the piston rod. The connection seat includes an engagement section with which the clip is engageable for locking. Thus, in the assembly of the shock absorber, the clip securely retains and couples the spring, the mounting seat, and the connection seat together to prevent the spring from detaching during the operation of the shock absorber.

2 Claims, 5 Drawing Sheets

(56) References Cited

U.S. PATENT DOCUMENTS

| | | | | |
|---|---|---|---|---|
| 5,722,645 A * | 3/1998 | Reitter | ................... | B60G 11/16 267/177 |
| 5,839,963 A * | 11/1998 | Zingel | ..................... | F16F 1/122 267/178 |
| 6,726,191 B2 * | 4/2004 | Miyagawa | ........... | B60G 15/063 267/166 |
| 6,869,067 B2 * | 3/2005 | Duval | ..................... | F16F 1/126 267/179 |
| 7,395,829 B2 * | 7/2008 | Chapman | ............. | A61H 3/0277 135/68 |
| 7,806,392 B2 * | 10/2010 | Ishikawa | .............. | B60G 15/063 267/179 |
| 7,905,066 B2 * | 3/2011 | Pryor | ........................ | E04B 1/26 267/154 |
| 2014/0230222 A1 * | 8/2014 | Mizukoshi | .............. | F16F 1/122 29/428 |

\* cited by examiner

SHOCK ABSORBER SPRING RETENTION STRUCTURE OF REMOTE CONTROL CAR

TECHNICAL FIELD OF THE INVENTION

The present invention relates generally to a shock absorber spring retention structure of a remote control car, and more particularly to a structure that comprises a clip securely retaining a spring on a shock absorber.

DESCRIPTION OF THE PRIOR ART

Remote control cars or model cars are popular favorite entertainment products of the general public. The operation speed of the remote control cars may move is constantly increased and the performance is also constantly improved. Consequently, a severe challenge is emerging for the capability of the car body to take impact at a high speed and shock absorbers are components of the remote control car that are influenced most. A shock absorber is a device that couples between a car body and a wheel axle, for the purposes of supporting the car body and absorbing vibrations or shocks caused by the car moving through an uneven surface or impact applied to the car body due to a braking operation in order to provide an effect of cushioning, and also to properly apply a force to the wheel during the process of absorbing shocks and vibrations in order to maintain the wheel in constant contact with the road surface for complete use of a driving force or a braking force applied to the wheel. Thus, the overall performance of a shock absorber has great influences on the operability and stability of a remote control car.

Referring to FIG. 5, a conventional shock absorber for a remote control car is illustrated. The shock absorber generally comprises a shock absorption cylinder a, a piston rod b, a spring c, and a spring the mounting seat d. The shock absorption cylinder a and the piston rod b are assembled together for relative movement with respect to each other in an axial direction. And, the assembly has opposite ends to which an end cap a1 and a connection seat b1 are respectively mounted for coupling with a car body e1 and a wheel axle rocker arm e2 of the remote control car e. Further, the shock absorption cylinder a is provided, on an outside surface thereof, with an adjustment ring a2 threadingly screwed thereto. The spring c is arranged between the shock absorption cylinder a and the piston rod b. The spring c has a top that is supported on the adjustment ring a2 for adjustment of the elastic force of the spring c through up and down displacement of the adjustment ring. The spring c has a bottom that is held in position by the mounting seat d so as to be mounted to the connection seat b1 to complete the assembly of the shock absorber. However, in the use of the shock absorber, the car is subject to frequent impact resulting from high-speed movements so that the spring c may readily get detached from the mounting seat d. This would deteriorate the performance of the shock absorber and may also affect the control operation.

Further, to facilitate the convenience of assembly of the shock absorber or for replacement of parts, the mounting seat d of the shock absorber is often provided, in a side wall thereof, with an open slot d1. With the arrangement of the open slot d1, the mounting seat d can be directly fit to the connection seat b1. Such an arrangement, although facilitating the convenience of assembly and disassembly, often results in reduction of the overall strength of the mounting seat d. This, again, causes easy detachment and damage due to impacts resulting from high-speed movements, thereby affecting the operation of the car or even damaging the car due to the deteriorated performance of the shock absorber. Apparently, such a conventional structure of shock absorber does not suit the needs for powerful high-speed or off-road remote control cars.

In view of the above problems, the present invention aims to provide a shock absorber spring retention structure for a remote control car that helps overcome the problems.

SUMMARY OF THE INVENTION

The primary object of the present invention is to provide a shock absorber spring retention structure of a remote control car, which is a structure that is easy to assemble and disassemble and helps overcome the problem of structural instability and being easy to detach.

To achieve the above object, the present invention provides a shock absorber spring retention structure of a remote control car, which generally comprises a shock absorption cylinder, a piston rod, a spring, a mounting seat, and a clip. The shock absorption cylinder has a top to which an end cap is mounted. The end cap has a top that forms a coupling section for coupling to a car body of the remote control car. The shock absorption cylinder has a hollow interior that is filled with damping fluid and has an outside surface to which an adjustment ring is threadingly screwed. The piston rod has an end to which a piston disk that is receivable in the interior of the shock absorption cylinder is mounted and is assembled in such a way as to be movable, in an axial direction, with respect to the shock absorption cylinder so that the movement of the piston disk produces a damping effect. The piston rod has an end extending outside the cylinder and is provided with a connection seat for connection with a wheel axle rocker arm. The connection seat has a side surface on which an engagement section is formed. The spring is arranged between the shock absorption cylinder and the piston rod and has a top supported by the adjustment ring and a bottom held in position by a mounting seat so as to be coupled to the connection seat of the piston rod. The clip is rotatably coupled to a wire of the bottom of the spring and comprises an engagement locking section corresponding to and engageable with the engagement section of the connection seat. The engagement locking section comprises a locking pin. As such, to assemble the shock absorber, the locking pin of the clip and the engagement section of the connection seat are put into engagement with and thus coupled with each other so as to securely retain and couple the spring, the mounting seat, and the connection seat together to prevent the spring from getting detached during the operation of the shock absorber and thus affecting the performance of shock absorption and control operation.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
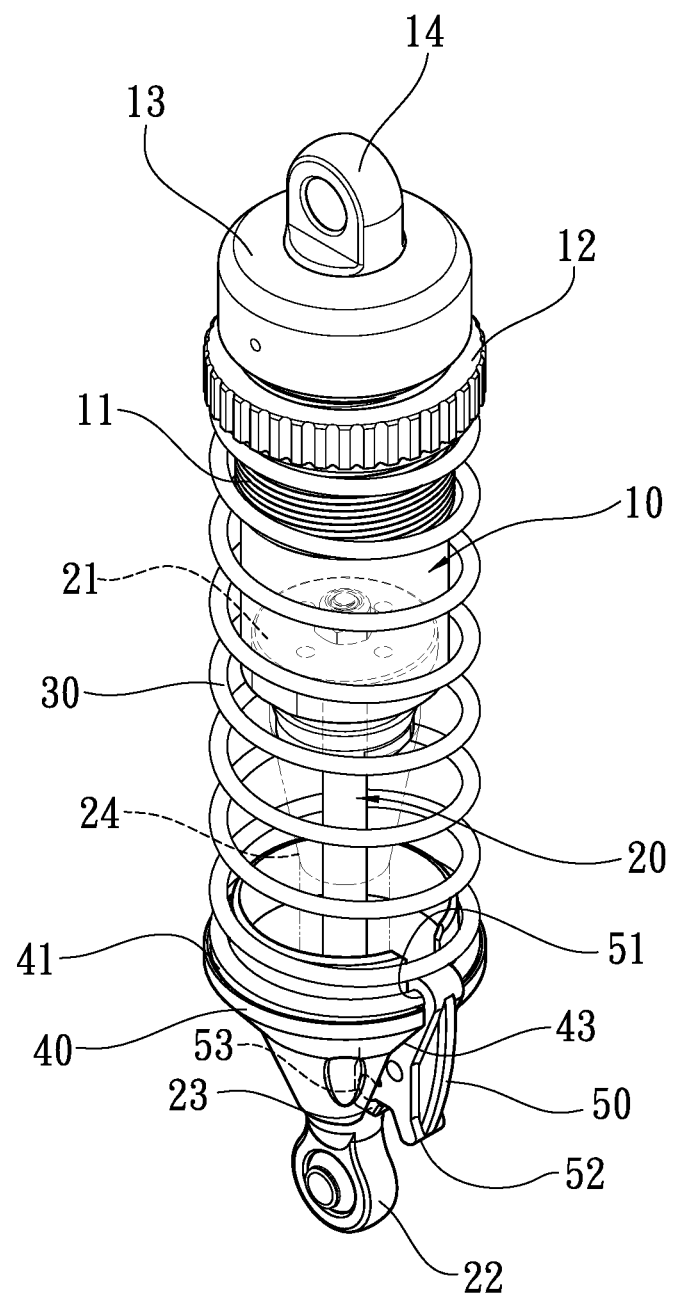
FIG. 1 is a perspective view of the present invention.
Figure 2:
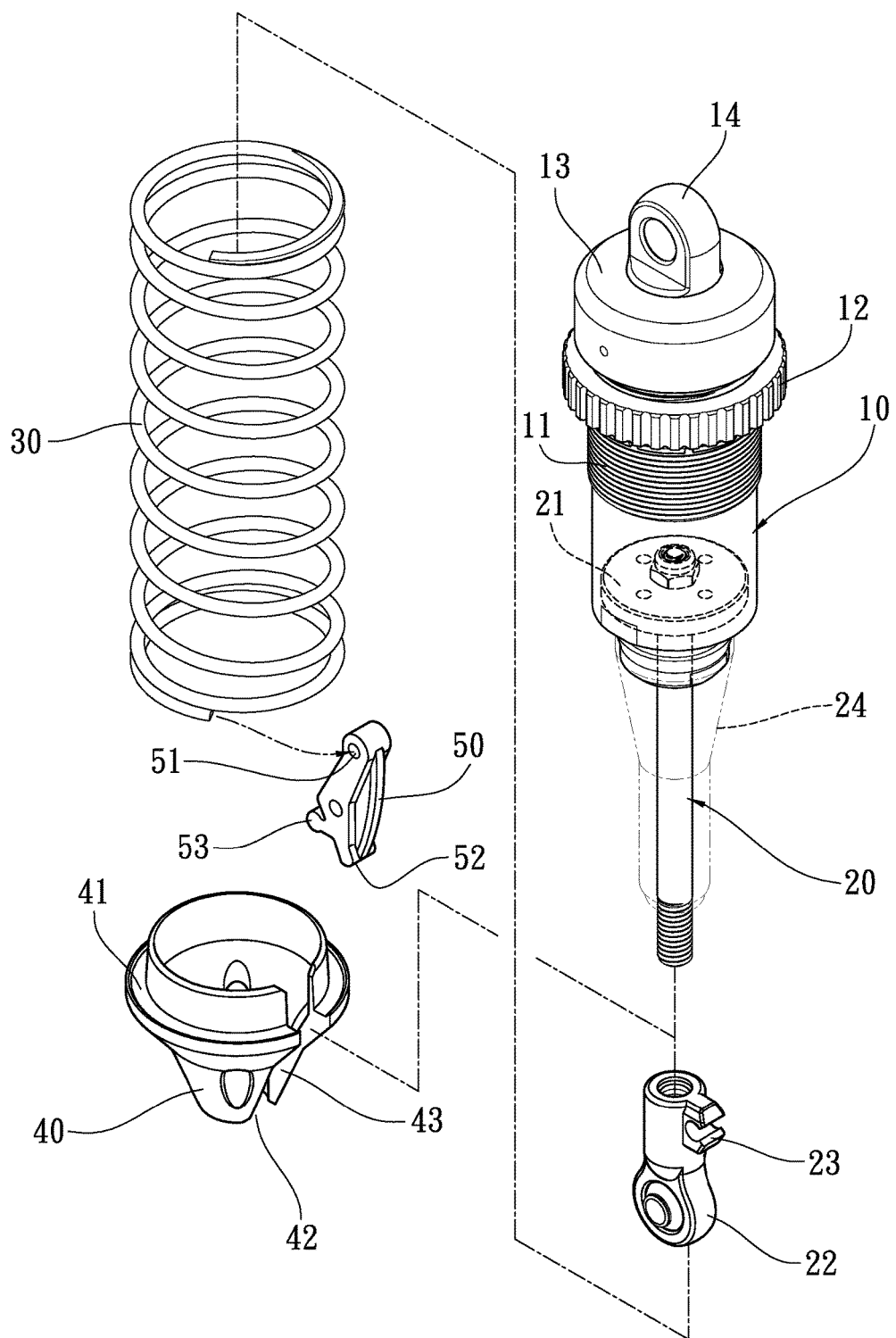
FIG. 2 is an exploded view of the present invention.
Figure 4:
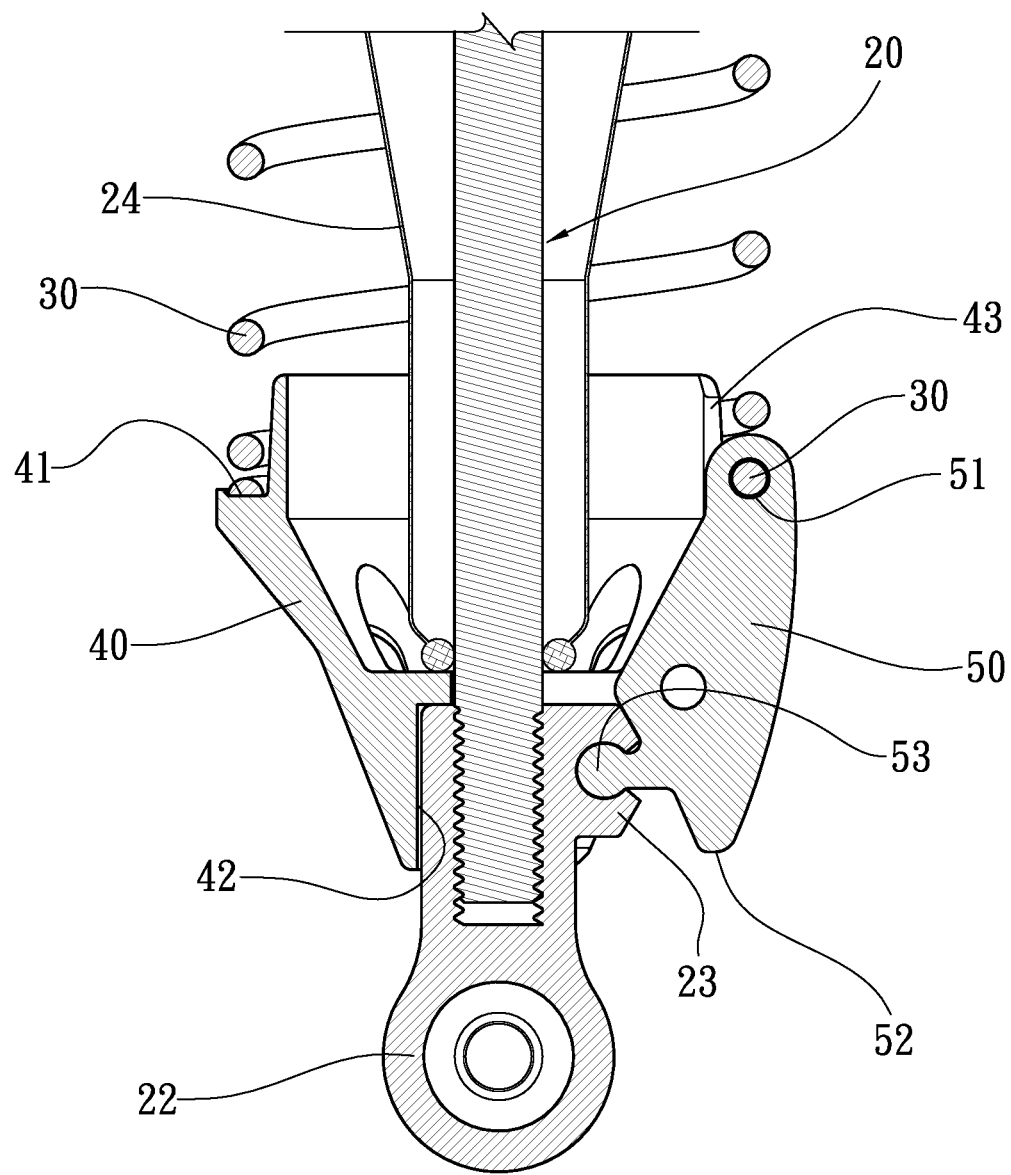
FIG. 4 is a cross-sectional view of a portion of the present invention.
Figure 5:
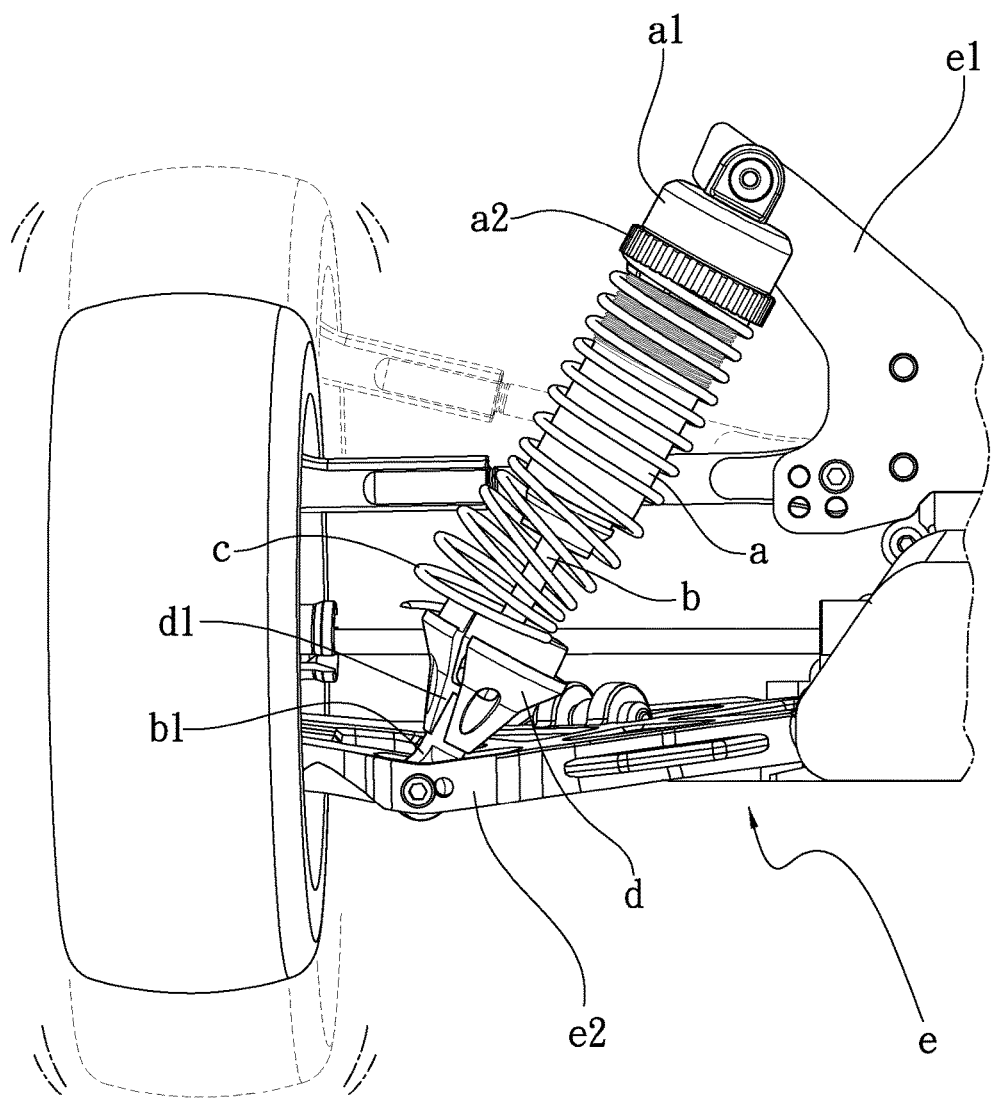
FIG. 5 is a schematic view illustrating a conventional shock absorber in a condition of use.

Referring to FIGS. 1, 2, and 4, the present invention provides a shock absorber spring retention structure of a remote control car, which generally comprises a shock absorption cylinder 10, a piston rod 20, a spring 30, a mounting seat 40, and a clip 50.

The shock absorption cylinder 10 comprises a cylindrical body on which an external thread 11 is formed to receive an adjustment ring 12 to threadingly couple thereto. The cylindrical body, which is hollow, is filled with damping fluid and is sealed and closed by an end cap 13. The end cap 3 has a top on which a coupling section 14 is mounted for coupling with a car body of the remote control car.

The piston rod 20 and the shock absorption cylinder 10 are assembled together in such a way that the piston rod is axially movable within the cylinder, allowing them to move axially with respect to each other. The rod has an end to which a piston disk 21, which has an outer circumference in contact engagement with an inside surface of the shock absorption cylinder 10 for providing a piston movement to induce a damping effect, is mounted. The rod has an opposite end that extends outside the shock absorption cylinder 10 to couple to a connection seat 22 that is provided for coupling with a rocker arm of a wheel axle. The connection seat 22 has a side surface on which an engagement section 23 is formed. In the instant embodiment, the engagement section 23 has a configuration in the form of a C-shaped channel. A dustproof cover 24 is fit over an upper portion of the connection seat 22 for protection against dust and mud.

The spring 30 is arranged between the shock absorption cylinder 10 and the piston rod 20 and has a top end supported on the adjustment ring 12 that is screwed on the outer circumference of the shock absorption cylinder 10 and is adjustable by the adjustment ring 12 moving, through the treading engagement, up and down for regulation of the elastic force thereof. The spring 30 has a bottom that is held in position by the mounting seat 40 on the connection seat 22 of the piston rod 20 to support the car body and absorb impacts induced in the vertical direction.

The mounting seat 40 has a top on which a bearing section 41 is formed for bearing and supporting the bottom of the spring 30 thereon and a bottom on which a jointing section 42 is formed. The jointing section 42 has a circumferential wall in which an open slot 43 is formed and extends therethrough. The open slot 43 allows the mounting seat 40 to be directly sleeved over, and encompassing, the piston rod 20 and is fit to the connection seat 22.

The clip 50 is pivotally coupled to a wire of the spring 30 at the bottom of the spring and is receivable in the open slot 43 of the mounting seat 40 through rotation thereof with respect to the wire of the spring. In the instant embodiment, the clip 50 is provided, at a pivoting end thereof, with a through hole 51 through which an end of the wire of the spring 30 is received to form the pivotal coupling therebetween, and is also provided, at an opposite end thereof, with a force application section 52 that is accessible by a user for applying a force thereto to push/pull the clip. The clip 50 is provided, at a portion thereof corresponding to the engagement section 23 of the connection seat 22, with a counterpart engagement locking section. In the embodiment illustrated in the drawings, the engagement locking section comprises a locking pin 53. The locking pin 53 is of a cylindrical form corresponding to and engageable with the C-shaped channel of the engagement section 23 of the connection seat 22.

It is noted here that the connection seat 22 is structured to comprises an engagement section 23 and the clip 50 comprises an engagement locking section, wherein the engagement locking section is in the form of a locking pin 53, so that the engagement section 23 and the locking pin 53 may engage with each other to provide an effect of securely retaining and coupling. It is apparent that other mutual locking arrangements, including coupling, fitting, pivotal joint, and tenon joint, providing a similar effect are equivalent and also belong to the scope of the present invention defined in the appended claims.

Figure 3:
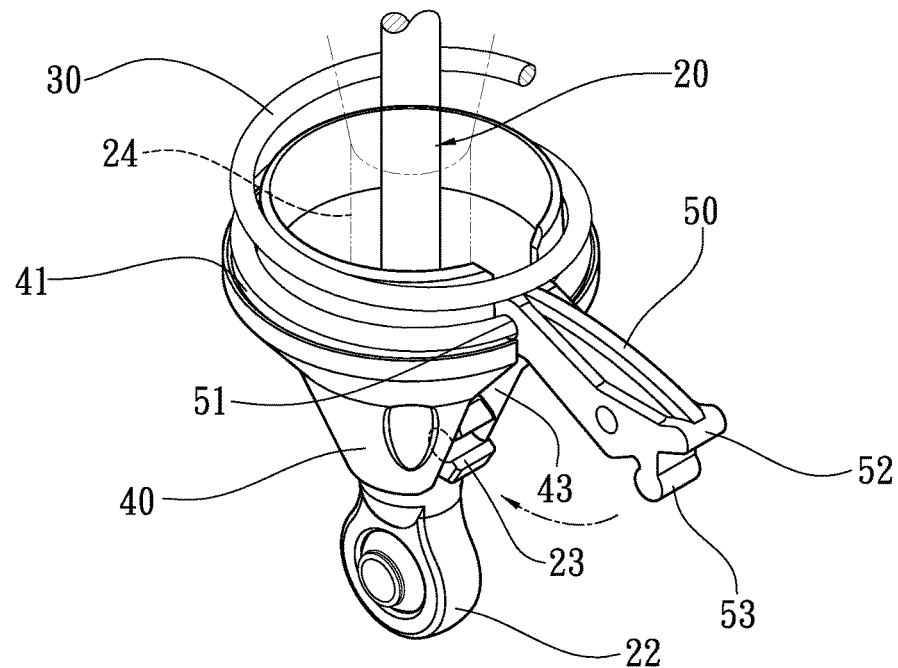
FIG. 3 is a schematic view illustrating a locking operation of a clip according to the present invention.
Figure 3A:
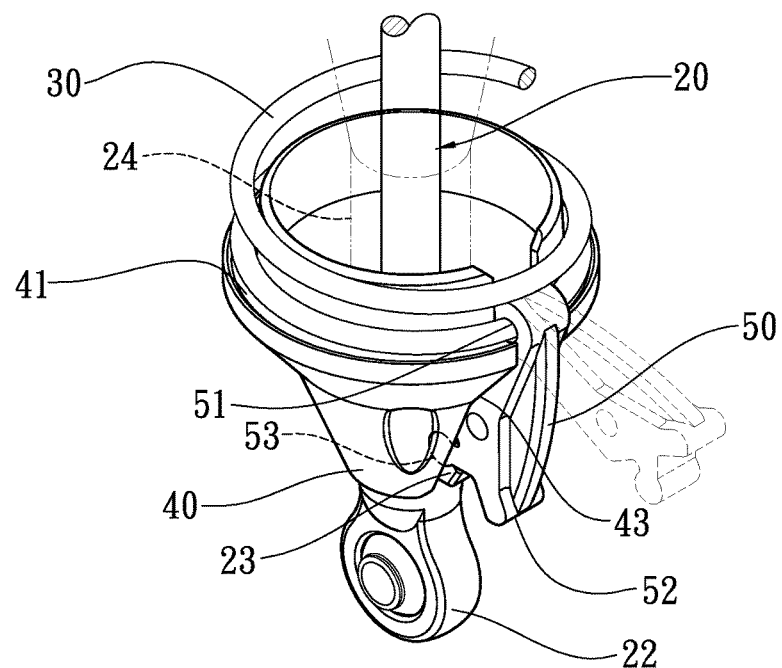
FIG. 3A is a schematic view illustrating a locked condition of the clip according to the present invention.

Referring to FIGS. 3, 3a, and 4, to assemble and use the present invention, the locking pin 53 of the clip 50 and the engagement section 23 of the connection seat 22 are fit to and thus in engagement with each other for rotatable coupling through which the spring 30, the mounting seat 40 and the connection seat 22 of the piston rod 20 may be securely coupled together, whereby when the car body is acted upon by severe impact resulting from high speed movement, the spring can be securely held and prevented from separation, which may affect the overall performance of shock absorption and operation, resulting from intense up and down movements of the shock absorber. Further, to remove or replace parts of the shock absorber, it only needs to disengage the locking pin 53 of the clip 50 from the engagement section 23 of the connection seat 22 to achieve quick detaching. Thus, the present invention features both secured retention and convenience of assembly and disassembly. Further, since the clip 50 of the present invention is received in the open slot 43 of the mounting seat 40, it can fill up the cutoff portion of the mounting seat formed by the open slot 43 so as to improve the overall strength of the mounting seat 40 and to help prevent the mounting seat 40 from being deformed or detached and damaged due to high speed impacts.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A shock absorber of a remote control car, comprising a shock absorption cylinder, a piston rod, a spring, a mounting seat, and a clip, the spring being arranged between the shock absorption cylinder and the piston rod, the piston rod having a bottom to which a connection seat is mounted, a mounting seat being fit to the connection seat for holding a bottom of the spring, wherein the connection seat comprises an engagement section and a wire of the bottom of the spring is coupled to the clip, the clip comprising an engagement locking section corresponding to and receivably engageable with the engagement section of the connection seat so that with the engagement locking section and the engagement section engaging with and coupled to each other, the spring, the mounting seat, and the connection seat are securely retained and coupled together; the engagement locking section of the clip comprises a locking pin; the locking pin of the clip is of a cylindrical form and the engagement section of the connection seat comprises a C-shaped channel in which the cylindrical form of the locking pin is receivable for engagement therebetween.

2. The shock absorber according to claim 1, wherein the wire of the spring is rotatably coupled to the clip, which comprises a pivoting end comprising a through hole formed therein to receive an end of the wire of the spring to extend therethrough to form the rotatable coupling and an opposite end forming a force application section adapted to receive a force applied by a user for operating the clip.

* * * * *